UNITED STATES PATENT OFFICE.

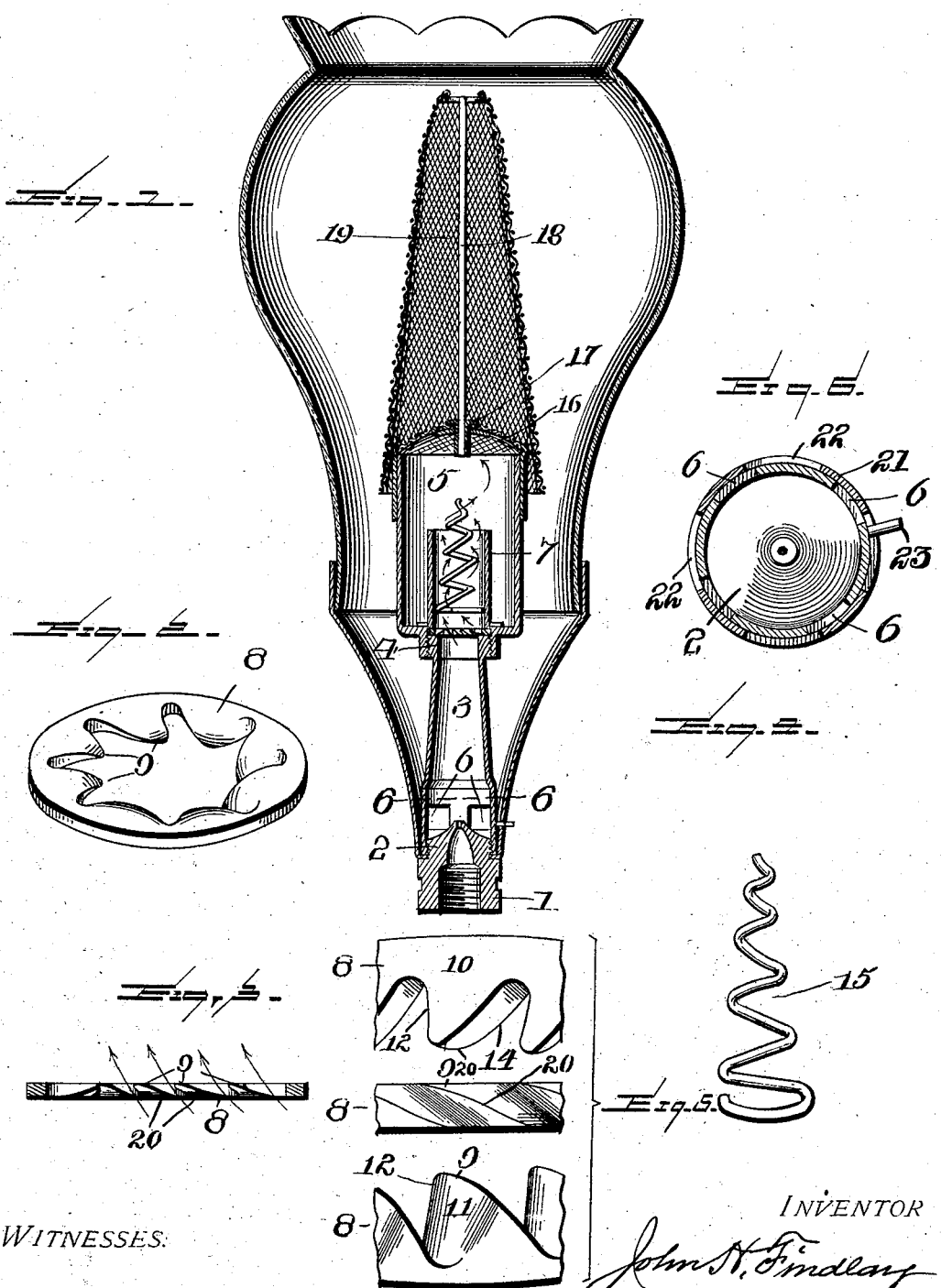

JOHN H. FINDLAY, OF OGDENSBURG, NEW YORK.

INCANDESCENT GAS-BURNER.

SPECIFICATION forming part of Letters Patent No. 725,947, dated April 21, 1903.

Application filed June 20, 1902. Serial No. 112,463. (No model.)

*To all whom it may concern:*

Be it known that I, JOHN H. FINDLAY, a citizen of the United States, residing at Ogdensburg, in the county of St. Lawrence and State of New York, have invented certain new and useful Improvements in Incandescent Gas-Burners; and I do hereby declare the following to be a full, clear, and exact description of the invention, such as will enable others skilled in the art to which it appertains to make and use the same.

My invention relates to certain new and useful improvements in incandescent gas-burners, and has for its object an improved mixing device which will impart a rotary motion to the current of gas and air drawn into the mixing-chamber effecting a thorough commingling of the air and gas previous to the ignition in the burner. Further, I propose to effect a commingling of the air and gas under all conditions, providing for a light pressure as well as a high pressure of gas, by novel means, to be hereinafter described and then set forth in the claims.

Other objects of the invention reside in the simplicity and economical construction, the efficient operation, the comparative inexpense to manufacture, and the elimination of any elements apt to become deranged or clogged with extraneous substances, and thus impair the efficiency of the device.

With the above and other objects in view the invention further resides in the novel details of construction and combination of parts to be fully described in the following specification and then set forth in the claims.

In the accompanying drawings, illustrating the invention, and in which like characters of reference indicate similar parts throughout the several views, Figure 1 is a central vertical sectional view of the invention. Fig. 2 is a top plan view of the disk or washer. Fig. 3 is a central vertical sectional view thereof. Fig. 4 is an elevation of the coiled wire; and Fig. 5 is a top plan, end elevation, and bottom plan of one of the teeth or vanes of the disk or washer considerably enlarged. Fig. 6 is a horizontal section on line 6 6 of Fig. 1.

By reference to the accompanying drawings it will be noted that the base 1 is not unusual from those ordinarily employed, being screw-threaded to permit of its attachment to the source of supply. The upper portion of the base is screw-threaded on its exterior, as at 2, and receives the stem or pillar 3, interiorly threaded to be secured to the base 1. This stem is preferably formed with a slightly-contracted upper portion, which is enlarged and threaded, as shown at 4, to receive the mixing-chamber 5. The stem is provided with air-inlets 6 6, circumferentially arranged at its lower end to permit the necessary air to a thorough combustion of the gas to find ingress to the mixing-chamber. On its interior the stem carries or has formed integral therewith a cylinder 7, which extends about midway of the length of the mixing-chamber and which is open at its upper and lower portions.

A washer or disk is interposed between the stem and mixing-chamber and is centrally apertured and carries a series of circumferentially-arranged vanes 9 of a substantially V-shaped form. These vanes or teeth are flat on their upper sides 10 and have their lower sides tapering upwardly to a point 12. The sides of the vanes opposite to those just mentioned taper in a downward direction to a point 14 and form projections in the path of the upcoming gas and air, which will effectually cause the two to be thoroughly agitated and move in various directions, causing a commingling of the two previous to their being conducted to the point of ignition, or this disk may be made of thin sheet metal, the vanes being bent to incline from the horizontal, as above described, in which case both upper and lower sides of the disk would be alike and operate in same manner as the thicker disk. Both of the sides of the teeth or vanes taper forwardly toward the center of the disk or washer, as at 20, and, as will be noted, are angularly disposed with relation to the vertical axis of the washer. The upcoming gas and air striking the under sides 11 of the vanes will naturally follow and be guided by the curvature of such sides and be deflected inwardly and will mix with that portion of the air and gas which has continued upwardly at the point 14. Located above this winged washer is one or more coiled wires 15, carried within the cylinder, the convolutions of the same decreasing in diameter toward the upper portion thereof. Of course it will be understood that under normal circumstances both of these agitating or mixing devices need not be employed, though both have been found to be advantageous when a high pressure of gas exists, which assures a thorough commingling, which would not be had were only one employed. The combined globe-holder and air-regulator 21, as shown, surrounds the mixing-chamber and carries the globe, being provided with air-apertures 22 for the purpose of permitting air to enter the stem and mixing-chamber through inlets 6. The stem or pillar may be readily actuated by means of the pin 23. This air-regulator has an obvious advantage in that the regulation may be effected without removing any portions of the burner, it being merely necessary to move the stem or pillar to let a greater or less amount of air find ingress through the opening of the globe-holder in the stem or pillar and from thence to the mixing-chamber, and has for a further advantage that the regulation may be effected within sight of the operator and the adjustment therefor effected to as fine a degree as possible.

The disk or washer, it will be noted, is secured between the lower portion of the cylinder and the upper end of the stem, being seated on the latter, and may be readily replaced and removed by simply removing the stem, as will be understood.

As previously stated, I do not propose to use both the disk or washer and the coiled spring under normal conditions, as one or the other has been found to give satisfaction when a comparatively light pressure of gas exists. The wire lying in the path of the upcoming gas and air will have a tendency to impart a rotary motion to the same, and thereby effect a thorough commingling previous to the arrival at the point of ignition. These devices are very simple in construction and contain no parts whatever which might become deranged and, further, are comparatively inexpensive to manufacture.

Having fully described my invention, what I claim as new, and desire to secure by Letters Patent, is—

1. A device of the type set forth consisting of a disk provided with a series of inwardly-extending vanes having angularly-disposed sides, and located at the inlet of the mixing-chamber.

2. A device of the type set forth consisting of a disk having a series of inwardly-extending vanes located at the inlet of the mixing-chamber, and a coiled wire, located above said disk.

3. A device of the type set forth consisting of a mixing-chamber and a disk having a series of inwardly-extending vanes, converging at their innermost ends to a point disposed angularly with relation to the vertical axis of the disk, and tapering sides on the said vanes merging into knife-edges located opposite to one another.

4. A device of the type set forth consisting of the mixing-chamber, a cylinder mounted within the mixing-chamber and carrying a coiled wire therein, the convolutions of which decrease toward the upper portion thereof, and a disk located at the lower portion of the mixing-chamber and over the inlet thereof, said disk having angularly-disposed vanes.

5. A device of the type set forth comprising a globe-holder having foraminous portions at its lower ends, a stem or pillar apertured at its lower end and adapted to register with said foraminous portions of the globe-holder, means whereby the stem may be revolved, a mixing-chamber carried by the stem, and means within the mixing-chamber for imparting a rotary motion to the current of air and gas.

6. A device of the type set forth consisting of a base and a pillar or stem supported thereby, a mixing-chamber on the pillar or stem carrying a cylinder on the interior thereof, and a disk having inwardly-extending vanes secured between the cylinder and the pillar or stem.

7. A device of the type set forth consisting of a globe-holder having foraminous portions at its lower end, a stem or pillar apertured at its lower end and adapted to register with the aforesaid foraminous portions of the globe-holder means for revolving the stem or pillar, and a mixing-chamber supported on said stem or pillar.

In testimony whereof I affix my signature in presence of two witnesses.

JOHN H. FINDLAY.

Witnesses:
MATTHEW BIGGER,
SAML. B. STEWART.